(12) United States Patent
Carlson et al.

(10) Patent No.: US 6,718,427 B1
(45) Date of Patent: Apr. 6, 2004

(54) METHOD AND SYSTEM UTILIZING DATA FRAGMENTS FOR EFFICIENTLY IMPORTING/EXPORTING REMOVABLE STORAGE VOLUMES

(75) Inventors: Wayne Charles Carlson, Tucson, AZ (US); Gregory Tad Kishi, Oro Valley, AZ (US); Jonathan Wayne Peake, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 09/694,750

(22) Filed: Oct. 23, 2000

(51) Int. Cl.7 .............................. G06F 12/00
(52) U.S. Cl. .............. 711/5; 707/2; 710/3; 360/48; 369/30.23; 369/59.25
(58) Field of Search .......... 360/48, 49, 72.2, 360/134; 369/30.23, 59.25; 707/2, 3, 205; 710/3, 52; 711/1, 4, 5, 111, 112, 113, 114, 115, 147, 148, 154, 161, 170, 171, 172, 173

(56) References Cited

U.S. PATENT DOCUMENTS

| | | | |
|---|---|---|---|
| 4,939,598 A | | 7/1990 | Kulakowski et al. |
| 5,034,914 A | | 7/1991 | Osterlund |
| 5,283,884 A | | 2/1994 | Menon et al. |
| 5,327,535 A | | 7/1994 | Ogata et al. |
| 5,335,328 A | * | 8/1994 | Dunn et al. ................... 710/33 |
| 5,546,557 A | | 8/1996 | Allen et al. |
| 5,584,008 A | | 12/1996 | Shimada et al. |
| 5,613,082 A | | 3/1997 | Brewer et al. |
| 5,613,097 A | | 3/1997 | Bates et al. |
| 5,950,218 A | * | 9/1999 | Howard .......................... 711/4 |
| 6,256,706 B1 | * | 7/2001 | Carlson et al. ............. 711/112 |
| 6,282,609 B1 | * | 8/2001 | Carlson ....................... 711/112 |
| 6,343,342 B1 | * | 1/2002 | Carlson ....................... 711/112 |
| 6,397,308 B1 | * | 5/2002 | Ofek et al. .................. 711/162 |

* cited by examiner

Primary Examiner—Donald Sparks
Assistant Examiner—Christian P. Chace
(74) Attorney, Agent, or Firm—Robert M. Sullivan; Bracewell & Patterson, L.L.P.

(57) ABSTRACT

A method and system utilizing data fragments for efficiently importing/exporting a removable storage volume having a number of data files from a first virtual storage system to a second virtual storage system. The method includes writing data fragments to the end of the removable storage volume in the first virtual storage system. In an advantageous embodiment, the data fragments are written to the end of the removable storage volume when the removable storage volume is closed. The data fragments contain information, such as data file headers, that uniquely identifies the data files residing in the removable storage volume. Next, the removable storage volume is transferred to the second virtual storage system. Upon receipt of the removable storage volume, the second virtual storage system updates a tape volume cache in the second virtual storage system utilizing the information contained in the data fragments without having to read each of the data files. In a related embodiment, the data fragments include at least one data file, a file header preceding the data file and a data fragment trailer.

23 Claims, 4 Drawing Sheets

METHOD AND SYSTEM UTILIZING DATA FRAGMENTS FOR EFFICIENTLY IMPORTING/EXPORTING REMOVABLE STORAGE VOLUMES

CROSS REFERENCE TO RELATED APPLICATIONS

The present application is related to the following U.S. patent application Ser. No. 09/695,724 filed concurrently on Oct. 23, 2000, entitled "Method and System for Efficiently Importing/Exporting Removable Storage Volumes Between Virtual Storage Systems." The above mentioned patent application is assigned to the assignee of the present application.

BACKGROUND OF THE INVENTION

1. Technical Field

The present invention relates in general to data storage and processing and, in particular to virtual storage systems. More particularly, the present invention relates to a method and system utilizing data fragments for efficiently importing/exporting removable storage volumes between virtual storage systems.

2. Description of the Related Art

In hierarchical virtual storage systems, intensively used and frequently accessed data is stored in fast but expensive memory. On example of a fast memory is a direct access storage device (DASD). In contrast, less frequently accessed data is stored in less expensive but slower memory. Examples of slower memory are tape drives and disk drive arrays. The goal of the hierarchy is to obtain moderately priced, high-capacity storage while maintaining high-speed access to the stored information.

One such hierarchical storage system is a virtual tape storage system (VTS), including a host data interface, a DASD, and a number of tape devices. When the host writes a logical volume, or a file, to the VTS, the data is stored as a file on the DASD. Although the DASD provides quick access to his data, it will eventually reach full capacity and a backup or secondary storage system will be needed. An International Business Machine (IBM) 3590 tape cartridge is one example of a tape device that could be used as a backup or secondary storage system.

When the DASD fills to a predetermined threshold, the logical volume data for a selected logical volume is appended onto a tape cartridge, or a physical volume, with the original left on the DASD for possible cache hits. When a DASD file has been appended to a tape cartridge and the original remains on the DASD, the file is "premigrated."

When the host reads a logical volume from the VTS, a cache hit occurs if the logical volume currently resides on the DASD. If the logical volume is not on the DASD, a storage manager determines which of the physical tape volumes contains the logical volume. The corresponding physical volume is then mounted on one of the tape devices, and the data for the logical volume is transferred back to the DASD from the tape.

The logical volumes processed by a VTS fully emulate data volumes stored on physical storage media, such as tape media. Applications that utilize tape media for data storage typically employ a standard tape label at the beginning of the tape. The tape label is separated from the rest of the data files on the tape by a tapemark. To illustrate, the IBM standard tape label consists of three fields identified, for example, by VOL1, HDR1 and HDR2. Certain host operating systems, such as the IBM mainframe operating system type environment (MVS), whenever a tape volume is opened, the tape label is read. Data contained within the tape label, which had been written by the host operating system, identifies the data tape as well as the major dataset, i.e., data file, names contained on the data tape. The information in the tape label is then utilized by the host based tape operating system to verify the name and contents of the data tape.

The tape label, or header, is typically read by the host system, to ensure that the data tape is the correct data tape even if the data tape is being mounted as a "scratch" tape. If the entire content of a logical volume, i.e., emulated tape, has already been transferred to a data tape, a subsequent recall of the data on the data tape will be required to satisfy a read request for the header information. This, in turn, will require a mount of the physical data tape that contains the requested information, even if the logical volume is going to be overwritten, in which case a physical tape mount would not be necessary.

To minimize these unnecessary data tape mounts, whenever a logical volume is transferred, i.e., migrated, to a data tape, enough data to contain the entire tape label and its trailing tape mark is copied and stored in a "stub" on the DASD. Since header information for the data tapes are already present on the DASD, label reads for scratch mounts will not necessitate a physical tape mount for the particular data tapes. Generally, this information is not backed up as in the case of the data tapes. This, in turn, makes it difficult to quickly import and export data tapes to and from a VTS because all the data files must be read by the receiving VTS, in the case of an import operation, to reconstruct the stub information for the receiving VTS.

Accordingly, what is needed in the art is an improved method for importing/exporting data tapes from one VTS to another VTS that mitigates the above-discussed limitations in the prior art. More particularly, what is needed in the art is an improved method for importing/exporting data tapes that does not require reading every data file in the imported data tapes to generate the "stub" information on the receiving VTS's disk volume cache.

SUMMARY OF THE INVENTION

It is therefore an object of the invention to provide an improved virtual storage system.

It is another object of the invention to provide a method and system utilizing data fragments for efficiently importing/exporting removable storage volumes between virtual storage systems.

To achieve the foregoing objects, and in accordance with the invention as embodied and broadly described herein, a method and system utilizing data fragments for efficiently importing/exporting a removable storage volume having a number of data files from a first virtual storage system to a second virtual storage system is disclosed. The method includes writing data fragments to the end of the removable storage volume in the first virtual storage system. The data fragments contain information, such as data file headers, that uniquely identifies the data files residing in the removable storage volume. Next, the removable storage volume is transferred to the second virtual storage system. Upon receipt of the removable storage volume, the second virtual storage system updates a tape volume cache in the second virtual storage system utilizing the information contained in the data fragments without having to read each of the data files. In a related embodiment, the data fragments include at least one data file, a file header preceding the data file and a data fragment trailer. The data fragments are written to the end of the removable storage volume when the removable storage volume is closed.

In another embodiment of the present invention, the data fragments are written to the end of the removable storage volume after the removable storage volume has been idle for a period of time. This has the added advantage that if an intervening system crash occurs or a tape volume cache is damaged before the removable storage volume is filled, the data fragments in the partially filled removable storage volume can be utilized to restore the tape volume cache.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
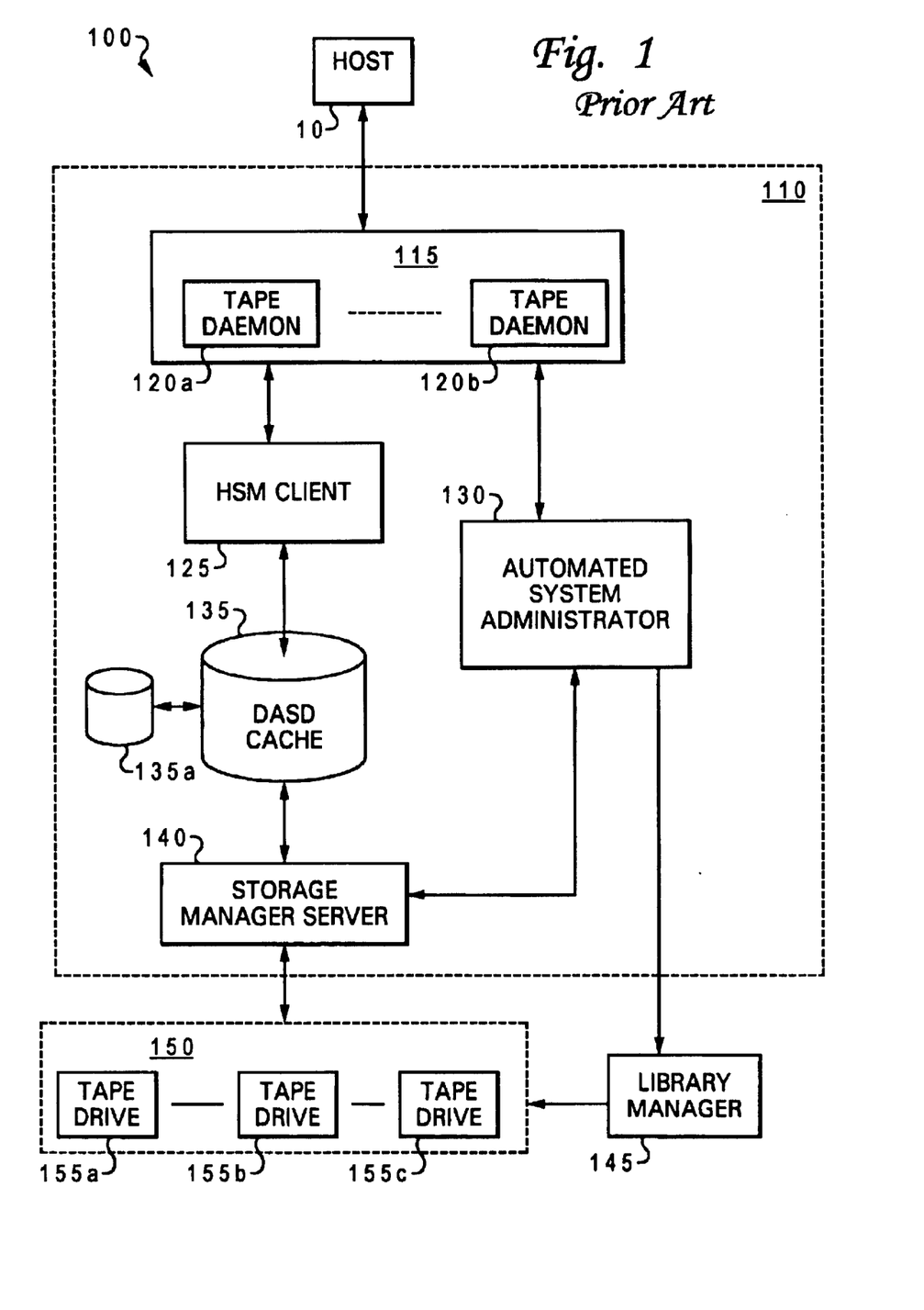
FIG. 1 illustrates a block diagram of an exemplary virtual storage system that provides a suitable environment for the practice of the present invention.

With reference now to the figures and in particular with reference to FIG. 1, there is depicted a block diagram of an exemplary virtual storage system 100 that provides a suitable environment for the practice of the present invention. Virtual storage system 100 includes a virtual tape server 110, a tape library 150 and a library manager 145. A host system 10 is linked to virtual tape server 110 via a network connection, e.g. TCP/IP, LAN, Ethernet, the IBM Enterprise System Connection (ESCON). In a preferred embodiment, host system 10 is a computer, such as a personal computer, workstation or mainframe, that is linked to the virtual tape server 110 via an ESCON channel. Virtual tape server 110, in an advantageous embodiment, is a computer, such as a personal computer, workstation or mainframe and is associated with a Direct Access Storage Device (DASD) cache 135. In a preferred embodiment, DASD cache 135 includes a plurality of hard disks that are spaced into redundant array of inexpensive disk (RAID) arrays. A separate data cache, i.e., tape volume cache 135a, is also shown in FIG. 1 and, in other advantageous embodiments, may be part of DASD 135.

Tape library 150 includes a plurality of tape drives, generally designated first, second and third tape drives 155a, 155b, 155c, such as the International Business Machine (IBM) Magstar 3590 tape drives. Generally, a removable storage volume, i.e., a tape cartridge, is loaded into each of the tape drives. Tape library 150 typically includes storage management software utilized to monitor the active space on the tape cartridges and schedule reclamations of tape cartridges when the system is less active. In an advantageous embodiment, tape library 150 is a tape library system such as the IBM Magstar 3494 Tape Library. Library manager 145 is utilized in virtual storage system 100 to install, maintain, configure, and operate tape library 150. Library manager 145 includes a controller (not shown), such as a personal computer or workstation that can assume direct control over tape library 150.

DASD cache 135 provides a cache for data stored in tape library 150. Tape volume cache 135a maintains logical volumes as logical volume files that are concatenated into physical volume files in the tape cartridges loaded in the tape drives located within tape library 150. When a logical volume file in DASD cache 135 moves to a tape drive in tape library 150, the logical volume file is written to a physical volume file on a tape cartridge in the actual tape drive. When a physical volume file is recalled from a tape drive and moved to tape volume cache 135a, the physical volume file then becomes a logical volume file in the tape volume cache 135a. In this way, tape volume cache 135a provides a window to host system 10 of all the physical volumes files in tape library 150.

Upon initialization, virtual tape server 110 loads a virtual tape controller 115 into random access memory (RAM). Virtual tape controller 115 includes a plurality of virtual tape daemons, generally designated first and second tape daemons 120a, 120b (for ease of explanation) that represent and emulate virtual tape devices to host system 10. Host system's 10 operating system, in turn, manages the presentation of the virtual tape devices to system users (not shown). Host system 10 views the virtual tape devices as actual tape drives and when host system 10 attempts to access a logical volume in a selected virtual tape device, the respective virtual tape daemon associated with the virtual tape device requested by the host system 10 will handle the host access request.

A hierarchical storage management (HSM) client program 125 within virtual tape server 110 intercepts and processes the access request from the virtual tape daemons. HSM client 125 then carries out host system 10 request to access the logical volume file in tape volume cache 135a. In a preferred embodiment, HSM client program 125 is part of the IBM ADSTAR Distributed Storage Manager (ADSM) product. The ADSM provides generic client/server HSM functions and includes an ADSM client to handle file access requests with software integrated with the operating system kernel.

Virtual tape server 110 also includes a storage manager server 140 that handles data transfers between DASD cache 135 and tape library 150. For example, if HSM client 125 attempts to mount a logical volume file that is not located in tape volume cache 135a, HSM client 125 will communicate the access request to storage manager server 140. If the tape in the access request is already mounted in a tape drive in tape library 150, storage manager server 140 will access the physical volume for the requested logical volume file from the mounted tape. However, if the requested file on a tape is not presently mounted in a tape drive, storage manager server 140 will initiate a request to library manager 145 to mount the tape containing the physical volume corresponding to the requested logical volume file. In preferred embodiments, the storage manager server 140 is part of the IBM ADSM product described above.

In a preferred embodiment, storage manager server 140 migrates entire logical volume files from tape volume cache 135*a* to tape library 150. When the available space in tape volume cache 135*a* reaches a predetermined level or after a predetermined period of time, an automated systems administrator 130 will direct storage manager server 140 to migrate logical volume files from tape volume cache 135*a* to tape library 150 for archival therein. HSM client 125 will then substitute the migrated logical volume file with a stub file that includes all the information needed to locate and recall a physical volume file from tape library 150 that corresponds to the logical volume. However, when HSM client 125 attempts to access information not included in a stub file, HSM client 125 will request that storage manager server 140 recall the logical volume file from the physical volume in tape library 150 to replace the stub file in tape volume cache 135*a*. Typically, HSM client 125 would migrate the least used logical volume files.

Automated systems administrator 130 is included in virtual tape server 110 to perform operations that typically performed by a human system administrator. Automated system administrator 130 filters any error messages concerning tape library 150 that are generated by storage manager server 140 that, in turn, receives error information updates from library manager 145. Typically, automated system administrator 130 stores information associated with the physical volumes in an associated volume status table (not shown). Automated system administrator 130 also utilizes a premigration table (not shown) that maintains information on any logical volume files that are in the process of being premigrated from tape volume cache 135*a* to tape library 150. During premigration, a logical volume file is locked while storage manager server 140 copies from the logical volume file in tape volume cache 135*a* to tape library 150. The file name is placed in the premigration table to indicate that the logical volume file is presently in the process of being premigrated. Once the logical volume file is copied over to tape library 150, the logical volume file name is removed from the premigration table. At this point, the logical volume file is maintained in both tape volume cache 135*a* and tape library 150. When the available space in tape volume cache 135*a* reaches a predetermined low threshold, the logical volume files that have been premigrated, such that a copy is maintained in both tape volume cache 135*a* and tape library 150, are deleted from tape volume cache 135*a* and replaced with a stub file. The process of deleting the logical volume files from tape volume cache 135*a* and replacing the moved files with a stub file is referred to herein as migration.

Whenever virtual tape server 110 processes a data tape for a scratch allocation operation, host system 10 first performs validation steps to ensure that the data tape mounted is usable as a scratch volume. The validation steps includes reading information from the data tape's volume label, or header. The information contained in the volume header typically contains the volume name, ownership and first data file name on the data tape. For example, the IBM 3494 Model B16 Virtual Tape Server system stores the first few records of all the logical volumes managed by the virtual tape server in tape volume cache 135*a*. This is accomplished even if the rest of the contents of a logical volume has been migrated out to a physical data tape. This allows a scratch mount request to be satisfied without having to recall the image of the logical volume from its corresponding physical data tape. These records, contained in a data fragment and stored in tape volume cache 135*a* are utilized by host system 10 to accomplish the validation that a volume is eligible for use as a scratch volume. One example of the construction and contents of data fragments is disclosed in U.S. patent application Ser. No. 08/919,043, entitled "Storage and Access to Scratch Mounts in VTS system," filed Aug. 27, 1997, and herein incorporated in its entirety by reference. Since typically 50% of data tape mounts are scratch mounts, the utilization of these data fragments enhances the overall system performance of virtual tape server 110.

Figure 2A:
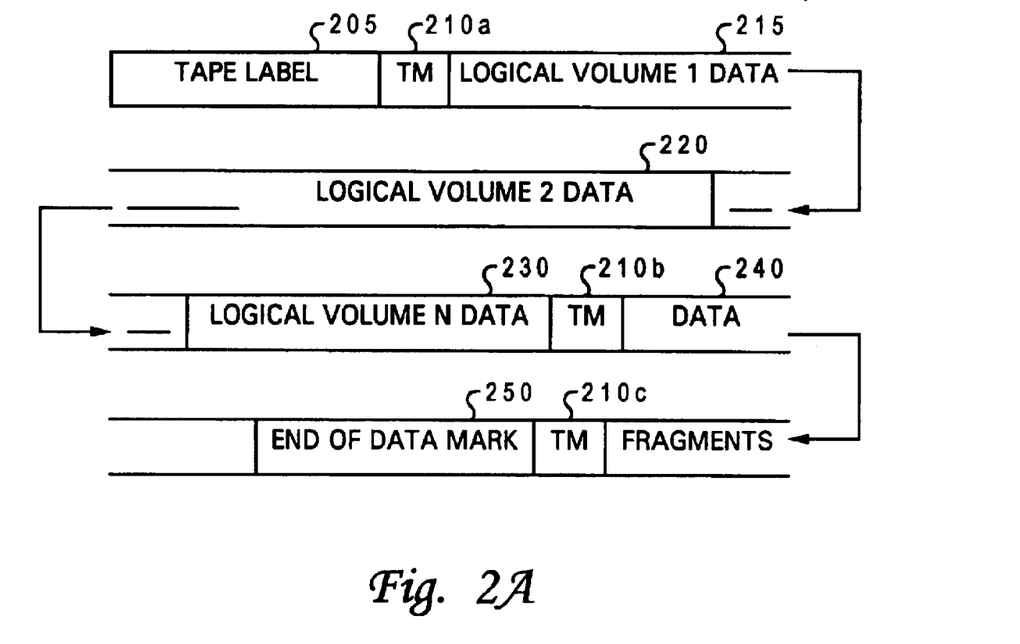
FIGS. 2A and 2B illustrate a simplified representation of an embodiment of an organization of contents in a removable storage volume according to the present invention.
Figure 2B:
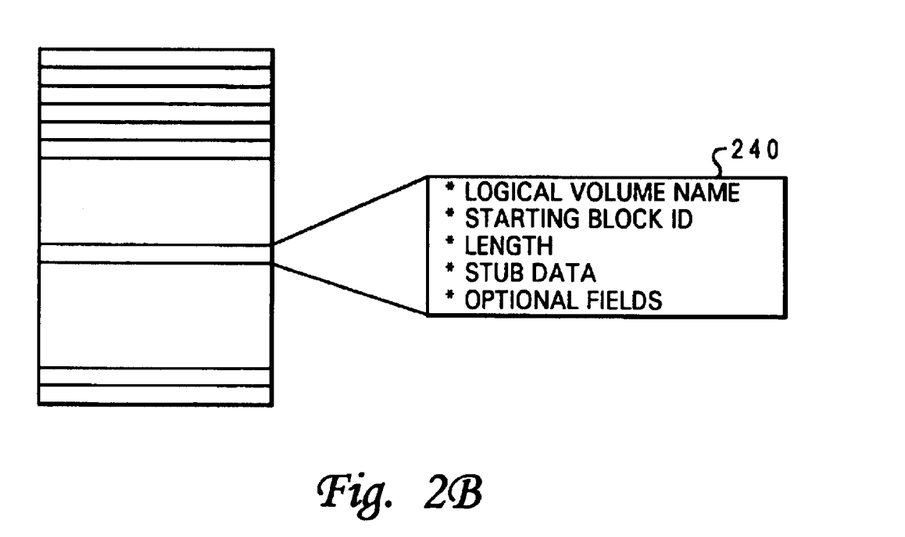

Referring now to FIGS. 2A and 2B, there are illustrated simplified representations of an embodiment of an organization of contents 200 in a removable storage volume according to the present invention. The formatting of the contents 200 in the removable storage volume, such as magnetic tape, begins with a tape label 205 that uniquely identifies this particular removable storage volume, e.g., the volume serial number. A first tapemark 210*a*, e.g., a unique sequence of bits, separates tape label 205 from first logical volume data 215 that may contain data files corresponding to a particular customer or project. As shown in FIG. 2A, the removable storage volume also includes second logical volume data 220 up to N logical volumes data 230 followed by a second tapemark 210*b*, also known as a "filemark," to indicate the end of the logical volume data. Generally, data blocks, e.g., tape label 205 and first logical volume data, stored on a removable storage volume are organized in groups forming structures of two kinds: user-defined data sets or "data files" and "labels" that are a group of blocks that identify and describe the removable storage volume and/or a data file. The next contiguous block in the removable storage volume is a data fragment 240 file that, in an advantageous embodiment, is a data file. A third tapemark 210*c* separates data fragments 240 from an end of data mark 250, i.e., end of volume indication, that may, for example, be two contiguous tapemarks.

Data fragments 240, as depicted in FIG. 2B, contains fragment of data from each of the data files residing in the removable storage volume, such as header information. Generally, the data fragment includes ADSM information utilized in recalling the data file, VTS header information that identifies the logical volume and may provide, in an advantageous embodiment, size and timestamp information. The data fragment may also contain, for example, the first 3 Kbytes of a customer data as represented internally by a VTS. To illustrate, the customer data may begin with VOL1, HDR1, HDR2 and a tape mark. The VOL and HDR records are typically 80 bytes each and including the VTS format overhead, will fit in a data fragment easily. It is this "standard label" information that a host system will typically read on a scratch mount operation to verify that it has the right tape. Utilization of a scratch tape will then usually continue with the host system re-writing the tape from the tape's beginning, at which point the data in the logical volume (and data fragment) will no longer be required, having been replaced by the write data.

In a preferred embodiment, data fragments 240 is written whenever a removable storage volume is closed and the information (discussed above) in data fragments 240 is generated from information that is already residing in a tape volume cache. The virtual storage system's tape volume cache may be resident in a tape volume cache associated with the virtual storage system or, alternatively, may be resident in a separate direct access storage device. Thus, when the removable storage volume is exported, i.e., transferred to another virtual storage system, the information in data fragments 240 can be read quickly and more efficiently by the receiving virtual storage system to reconstruct the tape volume cache information in the receiving virtual storage system tape volume cache without having to read the entire content of the transferred removable storage volume or scan through the entire database if data fragments 240 was appended to the transferring virtual storage system database in an alternate embodiment. This results in faster operational readiness and enhances overall system performance.

Alternatively, in another advantageous embodiment, data fragments 240 is written to the stacked, i.e., mounted, removable storage volume whenever the stacked removable storage volume has been idle, i.e., not used, for a specified period of time. Thus, if an intervening system crash occurs before the removable storage volume is filled, data fragments will still exist, even for a partially filled storage volume. The data fragments can then be used to update the virtual storage system tape volume cache during the subsequent recovery operations. Utilizing the information in the data fragments to restore the crashed virtual storage system tape volume cache instead of having to read each data file in the associated removable storage volume to obtain the necessary information results in faster recovery times and enhances system performance. The process of generating of data fragments and the utilization of the data fragments in an import operation is described in greater detail hereinafter with respect to FIGS. 3 and 4, with continuing reference to FIGS. 1 and 2.

Figure 3:
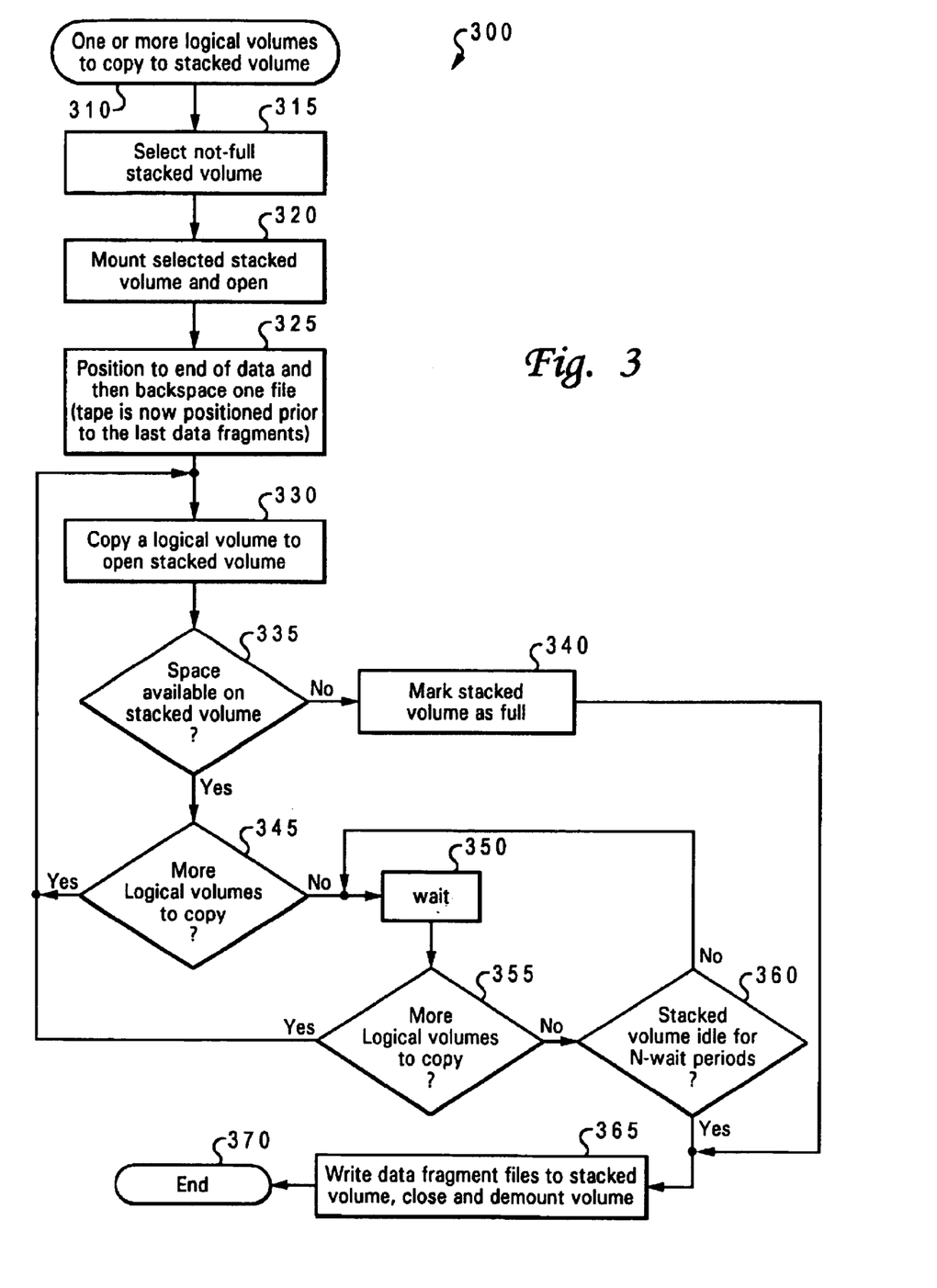
FIG. 3 illustrates a high-level process flow diagram for writing to a removable storage volume utilizing the principles disclosed by the present invention.

Referring now to FIG. 3, there is depicted a high-level process flow diagram 300 for writing to a removable storage volume utilizing the principles disclosed by the present invention. Process flow diagram 300 is initiated, as illustrated in step 310, when one or more logical volumes in tape volume cache 135a is scheduled to be copied onto a data tape, i.e., removable storage volume, in tape library 150. The copying of a logical volume to a physical data tape may be necessitated if data in tape volume cache 135a has reached a predetermined level. Storage manager server 140 will then select a data tape that is not full as depicted in step 315. After a non-full data tape has been selected, library manager 145 will execute the command to mount the data tape on one of the tape drives in tape library 150, following which, virtual tape server 110 will open the data tape, as illustrated in step 320. Following the mounting of the selected data tape on a tape drive, as depicted in step 325, storage manager server 140 positions a read/write head in the tape drive to the end of the data in the data tape and backspaces one data file. The data tape is now positioned prior to the data tape's data fragments file. Alternatively, in another advantageous embodiment, virtual tape server 110 may start at the beginning of the data tape and forward space to second tapemark 210b. Next, storage manager server 140 will migrate, i.e., copy, a logical volume file to the data tape.

After the logical volume file has been written onto the data tape, process 300 determines if there is additional space available on the opened data tape for more logical volume files, as illustrated in decisional step 335. If process 300 determines if there is no more space available on the opened data tape, the opened data tape is marked as full, as depicted in step 340. After the opened data tape is marked as full, the data fragment file in the opened data tape is updated, i.e., a data fragment of the newly migrated logical volume is added to the existing data fragments, and the opened data tape is closed and demounted, i.e., archived, as illustrated in step 365.

Returning back to decisional step 335, if process 300 determines that there is more space available on the opened data tape for more data files, another determination is made, as depicted in decisional step 345, to ascertain if there are more logical volumes that need to be copied onto the opened data tape. If there is another logical volume that needs to be copied, process 300 proceeds to step 330 to initiate another copying operation. However, if process 300 determines that there are no more logical volumes queued for migration, process 300 resorts to an idle state for a predetermined period of time, as illustrated in step 350. After waiting for the specified period of time, process 300 again checks to see if another logical volume is scheduled to be migrated from tape volume cache 135a to the opened data tape, as depicted in decisional step 355. If there is another logical volume scheduled to be migrated to the opened data tape, process 300 proceeds back to step 330 to initiate another copying operation. If, on the other hand, process 300 determines that there is no logical volume in tape volume cache 135a required to be migrated to the opened data tape, process 300 makes another determination, as illustrated in decisional step 360, to ascertain if the opened data tape has been idled for a predetermined period of time.

The predetermined period of time may, in an advantageous embodiment, be a set number of wait cycles. It should be noted that the present invention does not contemplate limiting its practice to any one set period of idle time or a specific number of wait cycles. If process 300 determines that the opened data tape has not been idled for the specified period of time, process 300 proceeds back to step 350, where process 300 reverts back to an idle state for the specified period of time. If, however, process 300 determines that the opened data tape has been idled for a period equal to or greater than the predetermined waiting period, process 300 proceeds on to step 365 discussed previously, where the associated data fragment file in the opened data tape is updated with the data fragments that uniquely identifies all the newly copied logical volumes. After the data fragments have been updated, the opened data tape is then closed and demounted and process 300 is terminated, as depicted in step 370.

Figure 4:
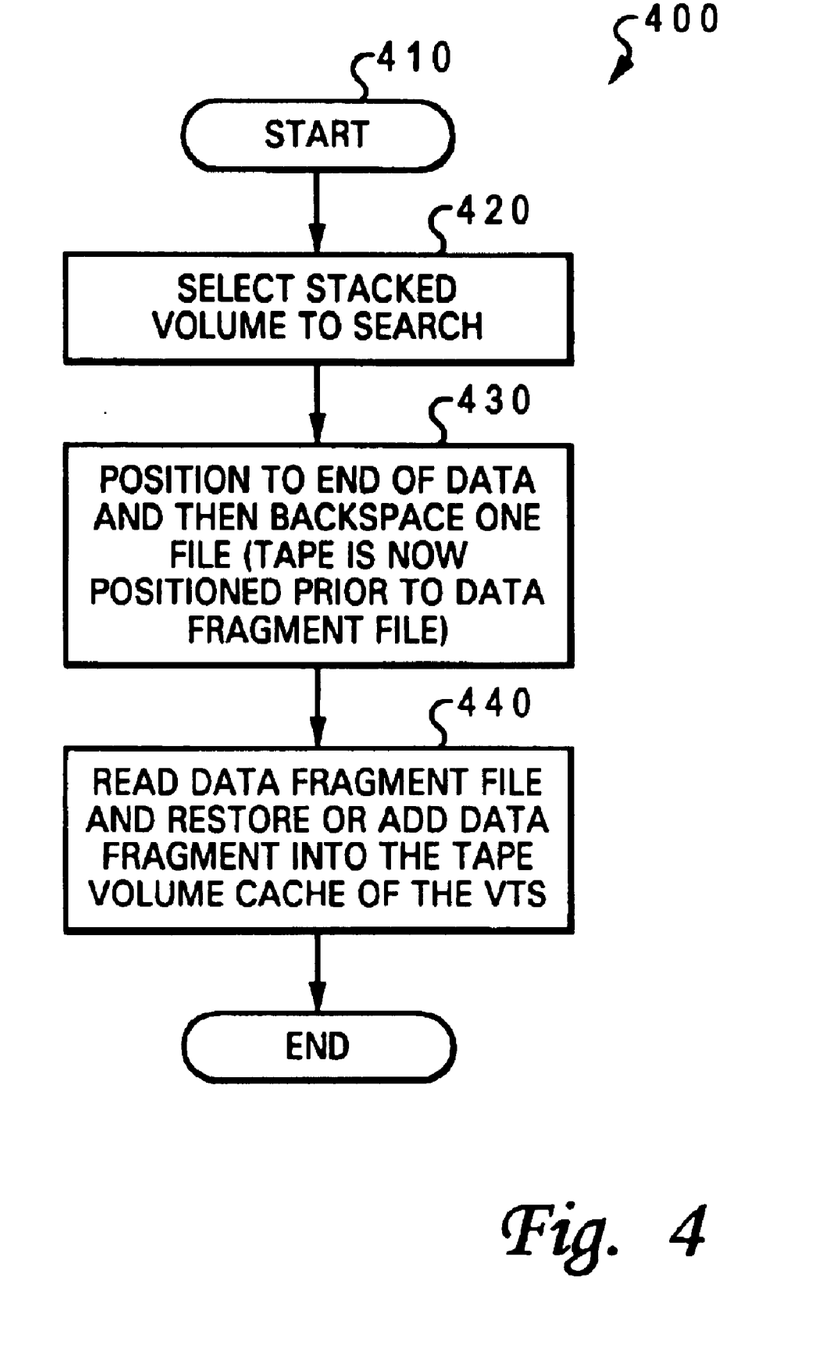
FIG. 4 illustrates a process flow diagram for importing a data tape into a virtual storage system from another virtual storage system according to the present invention.

Referring now to FIG. 4, there is illustrated a process flow diagram 400 for importing a data tape into a virtual storage system from another virtual storage system according to the present invention. Process 400 is initiated, as illustrated in step 410, when a data tape is transferred from one virtual storage system to another. The receiving virtual storage system mounts and opens the data tape utilizing one its available tape drives in its tape library, as depicted in step 420. The receiving virtual storage system then opens and positions the data tape to its end of the data field and backspaces one data file. Alternatively, in another advantageous embodiment, the receiving virtual tape server may start at the beginning of the data tape and forward space to the data fragment file. The opened data tape is now positioned at the beginning of the opened data tape associated data fragment file, as illustrated in step 430. Process 400 then reads the data fragments and copies the information that uniquely identifies the data files recorded in the data tape to a tape volume cache associated with the receiving virtual storage system, as depicted in step 440.

Alternatively, in another advantageous embodiment, process 400 may also be used to more efficiently restore a virtual storage system's tape volume cache following, for example, a system crash that had corrupted or erase the contents in the tape volume cache. In this alternate embodiment, following a system crash, each of the data tapes in an associated tape library is mounted and opened. The data fragments in each data tape is then read and copied to the virtual storage system's tape volume cache to restore the information that had been lost or corrupted. Having to only read a single data file, i.e., data fragment file, in each data tape instead of having read all the data files in each data tape to recover the information lost in the tape volume cache results in a shorter recovery operation from a system crash that ultimately enhances overall system performance and reliability.

It should be noted that although the present invention has been described, in one embodiment, in the context of a computer system, those skilled in the art will readily appreciate that the methods of the present invention described hereinabove may be implemented, for example, by operating storage manager server 140 or other suitable electronic module to execute a corresponding sequence of machine-readable instructions. These instructions may reside in various types of signal-bearing media. In this respect, one aspect of the present invention concerns a programmed product, that includes signal-bearing media tangibly embodying a program of machine-readable instructions executable by a digital data processor to perform the methods described above. The present invention does not contemplate limiting its practice to any particular type of signal-bearing media, i.e., computer readable medium, utilized to actually carry out the distribution. Examples of signal-bearing media includes recordable type media, such as floppy disks and hard disk drives, and transmission type media such as digital and analog communication links and wireless.

While the invention has been particularly shown and described with reference to a preferred embodiment, it will be understood by those skilled in the art that various changes in form and detail may be made therein without departing from the spirit and scope of the invention.

What is claimed is:

1. A method for efficiently importing/exporting a removable storage volume from a first virtual storage system to a second virtual storage system utilizing a plurality of data fragments, said method comprising the steps of:
    writing a plurality of data fragments to the end of said removable storage volume used by said first virtual storage system, wherein each of said plurality of data fragments is a portion of a corresponding data file located in said removable storage volume, said portion including an identifier stub of said data file, said identifier stub being a copy of an identifier, of said data file, as written by a host using said data file;
    transferring said removable storage volume to said second virtual storage system; and
    updating a tape volume cache in said second virtual storage system utilizing said plurality of data fragments without having to read each of said plurality of data files.

2. The method as recited in claim 1, wherein each of said plurality of data fragments includes:
    at least one customer data file, said customer data file including a tape identifier, and at least one directory identifier.

3. The method as recited in claim 2, wherein said each of said plurality of data fragments further includes a data fragment trailer.

4. The method as recited in claim 1, wherein said step of writing a data fragment to the end of a removable storage volume is initiated when said removable storage volume is closed.

5. The method as recited in claim 1, wherein said step of writing said plurality of data fragments to the end of a removable storage volume is initiated after a pre-determined period of time that said removable storage volume is idle.

6. The method as recited in claim 2, wherein said plurality of data fragments are constructed utilizing information residing in a tape volume cache in said first virtual storage system.

7. The method as recited in claim 1, wherein said first and second virtual storage systems are different virtual tape servers.

8. A virtual storage system comprising:
    a direct access storage device;
    a plurality of removable storage volumes, operatively coupled to said direct access storage device to receive data; and
    a storage manager, coupled to said direct access storage device and said plurality of removable storage volumes, wherein said storage manager writes a plurality of data fragments to the end of a removable storage volume prior to exporting said removable storage volume, each of said plurality of data fragments being a portion of a corresponding data file located in said removable storage volume, said portion including an identifier stub of said data file, said identifier stub being a copy of an identifier, of said data file, as written by a host using said data file.

9. A virtual storage system, comprising:
    a direct access storage device;
    a plurality of removable storage volumes, operatively coupled to said direct access storage device to receive data; and
    a storage manager, coupled to said direct access storage device and said plurality of removable storage volumes, wherein said storage manager reads a plurality of data fragments of a removable storage volume, each of said data fragments being a portion of a corresponding data file located in one of said removable storage volumes, said portion including an identifier stub of said data file, said identifier stub being a copy of an identifier, of said data file, as written by a host using said data file, wherein said storage manager is capable of updating a tape volume cache utilizing information contained in said plurality of data fragments without having to read each of said plurality of data files in said removable storage volume.

10. The virtual storage system as recited in claim 8, wherein each of said plurality of data fragments includes:
    at least one customer data file, said customer data file including a tape identifier, and at least one directory identifier.

11. The method as recited in claim 10, wherein said each of said plurality of data fragments further includes a data fragment trailer.

12. The virtual storage system as recited in claim 8, wherein said plurality of data fragments is written to the end of said removable storage volume when said removable storage volume is closed.

13. The virtual storage system as recited in claim 8, wherein said plurality of data fragments is written to the end of said removable storage volume after a pre-determined period of time that said removable storage volume is idle.

14. The virtual storage system as recited in claim 8, wherein said plurality of data fragments is constructed utilizing information residing in a tape volume cache in said virtual storage system.

15. The virtual storage system as recited in claim 8, wherein said removable storage volume is a data tape.

16. A method for formatting a data tape that allows for efficient importing/exporting of said data tape from a first virtual storage system to a second virtual storage system, said method comprising the steps of:

writing a plurality of data files to said data tape;

utilizing a plurality of filemarks to separate said plurality of data files from each other; and writing a plurality of data fragments at the end of said data tape, wherein each of said plurality of data fragments is a portion of a corresponding data file in said data tape, said portion including an identifier stub of said data file, said identifier stub being a copy of an identifier, of said data file, as written by a host using said data file, thus allowing said second virtual storage system to update a tape volume cache in said second virtual storage system without having to read any of said plurality of data files in said data tape.

17. A computer program product, comprising:

a computer-readable medium having stored thereon computer executable instructions for implementing a method for efficiently importing/exporting a removable storage volume from a first virtual storage system to a second virtual storage system, said computer executable instructions when executed performing the steps of:

writing a plurality of data fragments to the end of said removable storage volume used by said first virtual storage system, wherein each of said plurality of data fragments is a portion of a corresponding data file located in said removable storage volume, said portion including an identifier stub of said data file, said identifier stub being a copy of an identifier, of said data file, as written by a host using said data file;

transferring said removable storage volume to said second virtual storage system; and updating a tape volume cache in said second virtual storage system utilizing said plurality of data fragments without having to read each of said plurality of data files.

18. The computer program product as recited in claim 17, wherein each of said data fragments includes:

at least one customer data file, said customer data file including a tape identifier, and at least one directory identifier.

19. The computer program product as recited in claim 18, wherein said each of said data fragments further includes a data fragment trailer.

20. The computer program product as recited in claim 17, wherein said step of writing a plurality of data fragments to the end of a removable storage volume is initiated when said removable storage volume is closed.

21. The computer program product as recited in claim 17, wherein said step of writing a plurality of data fragments to the end of a removable storage volume is initiated after a pre-determined period of time that said removable storage volume is idle.

22. The computer program product as recited in claim 17, wherein said plurality of data fragments is constructed utilizing information residing in a tape volume cache in said first virtual storage system.

23. The computer program product as recited in claim 17, wherein said removable storage volume is a data tape.

* * * * *